United States Patent [19]

McCoy

[11] Patent Number: 4,777,540

[45] Date of Patent: Oct. 11, 1988

[54] MAGNETIC CARD READER WITH HEAD STOP ARRANGEMENT

[75] Inventor: Bernard J. McCoy, Escondido, Calif.

[73] Assignee: American Magnetics Corp., Carson, Calif.

[21] Appl. No.: 840,692

[22] Filed: Mar. 18, 1986

[51] Int. Cl.$^4$ .......................... G11B 5/48; G11B 21/16
[52] U.S. Cl. ......................................... 360/2; 360/109; 360/137; 340/686; 81/461
[58] Field of Search .................... 360/109, 137, 2; 248/205.1, 225.31, 291, 289.1; 235/482, 484, 449

[56] References Cited

U.S. PATENT DOCUMENTS

| | | | |
|---|---|---|---|
| 4,259,699 | 3/1981 | Yoshida | 360/2 |
| 4,410,922 | 10/1983 | Babow et al. | 360/109 |
| 4,589,040 | 5/1986 | Kawasi | 360/109 |
| 4,616,280 | 10/1986 | Kobayashi et al. | 360/109 |
| 4,628,386 | 12/1986 | Chabrolle | 360/2 |
| 4,683,507 | 7/1987 | Roberts | 360/109 |
| 4,684,794 | 8/1987 | Holland-Letz | 235/449 |

*Primary Examiner*—Donald McElheny, Jr.
*Attorney, Agent, or Firm*—Marmorek, Guttman & Rubenstein

[57] ABSTRACT

A magnetic stripe reader adapted for reading stripes on media of different thicknesses includes a magnetic head with a position which adjusts to the medium thickness. A head stop arrangement permits a simple technique for setting the maximum head position to be used. A special tool is inserted in a bracket fixed to a reader wear plate. A bracket is positioned to mate with a head which is displaced its maximum distance from an opposing rail. A conducting shim is placed between the head and the opposing rail and a current flowing through an electric circuit including the head and the shim is measured by an ohmmeter in the circuit. The bracket rotates about a pin to adjust the position of the head until continuity of the circuit is broken. The bracket then is secured into position.

2 Claims, 3 Drawing Sheets

MAGNETIC CARD READER WITH HEAD STOP ARRANGEMENT

FIELD OF THE INVENTION

This invention relates to optical readers for characters on a medium such as a credit card and more particularly to a reader adapted to read such characters on media having a variety of thicknesses.

BACKGROUND OF THE INVENTION

A reader of characters on media having a variety of thicknesses is known in the art. The reader comprises a pair of rails spaced apart from one another and defining a maximum separation into which a medium is moved. The rails are secured to a wear plate, extending normal thereto and defining between them a channel in which the medium is placed. A read (and a write) head is positioned with respect to a first rail to detect the character as the medium is moved between the rails.

In order to accomodate media of different thicknesses, the spacing between the rails has to be adjustable. To this end, a platen is spring-loaded with respect to the first rail and biased into close proximity to the second rail to accomodate narrow media such as a check. The read (or write) head is suspended from the platen in a manner to permit independent adjustment and protrudes through a window in the platen. The spacing bewween the head and the opposing (second) rail on such a multimedia reader is maintained to 0.006"+/−0.001" in order to read OCR (optical character recognition) characters on media of a variety of thicknesses without causing an unacceptable amount of drag on the medium. The reader also has to be capable of reading magnetic characters thus creating the necessity for accurate spacing. It is clear that different relative positions are required for the heads, the platen and the rails for different media. The mechanical arrangements for ensuring that the different position requirements are met are typically costly, are difficult to set and in need of frequent adjustment. This is particularyy true of a head stop arrangement where a sensing head cannot be permitted to move outwardly to the extreme position occupied by a platen when a medium of maximum thickness is inserted between the rails. The head stop fixes the maximum movement of the head short of the maximum movement of the platen. The typical screw adjustment is almost inaccessible in the confines of close spaces available in such readers.

BRIEF DESCRIPTION OF THE INVENTION

The invention comprises a mechanical head stop arrangement which permits easy setting of the head stop with the use of a simple electrical circuit and special tool. The tool is inserted in a bracket fixed to the reader wear plate. The bracket is positioned to mate with a head which is displaced to its maximum distance from the opposing rail. A conducting shim is placed between the head and the opposing rail and a current flowing through a circuit including the head and the shim is measured by an ohmeter in the circuit. The bracket rotates about a pin to adjust the position of the head until continuity of the circuit is broken. The bracket then is secured into position. The bracket, the tool and the setting procedure provide a simple technique for setting heads in, for example, credit card readers.

DETAILED DESCRIPTION

Figure 1:
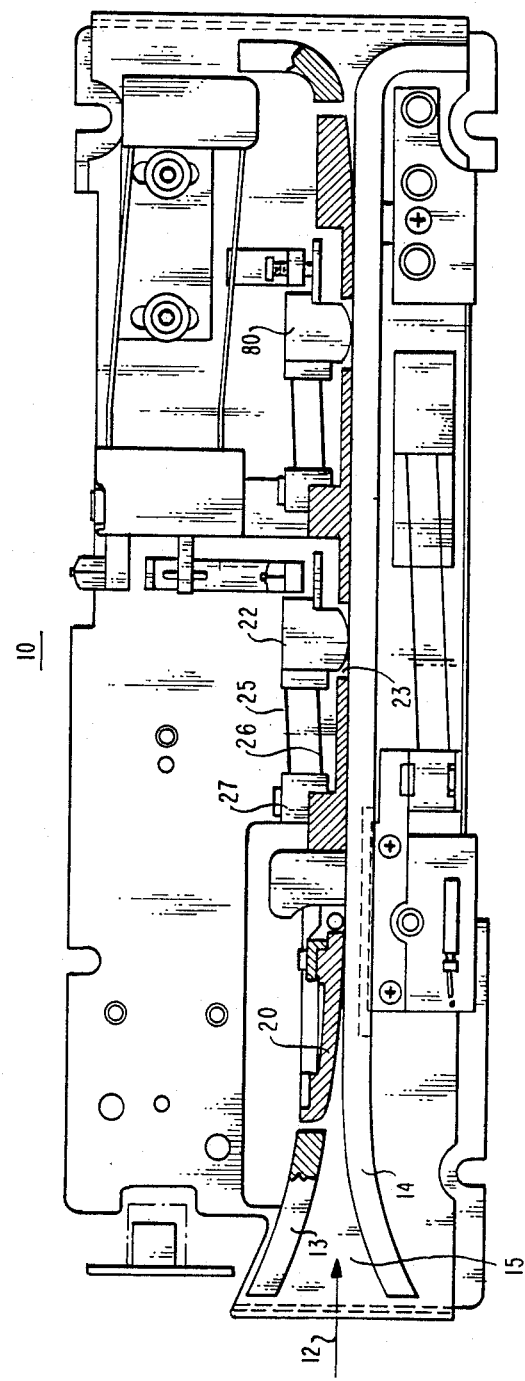
FIG. 1 is a top view of a prior art organization of mechanical components of a magnetic stripe reader adapted for reading media of different thicknesses.

FIG. 1 shows a reader 10 for a magnetic stripe card, passport, check or the like. The magnetic stripe-bearing medium to be read is moved in the direction of arrow 12 between rails 13 and 14. The medium moves with an edge abutting wear plate 15. Rails 13 and 14 are attached to wear plate 15 being spaced apart from one another in a manner to define a path between which a medium to be read is moved.

The reader is adapted to read media of different thicknesses. The spacing between the rails defines the maximum thickness for a medium readable by the reader. For media of less than maximum thickness, the reader includes a platen 20 which is spring-loaded with respect to rail 13 to move closer to rail 14 than the maximum spacing between the rails. The platen thus is adapted to define a medium receiving slot, with rail 14, which accomodates itself to the medium thickness. For reading a check, the platen is very close to rail 14. For reading a passport, the medium pushes the platen away from rail 14 to define a wider path for the medium. In all cases, a medium is moved along the path between the rails in a manner to present its magnetic stripe for reading by magnetic stripe reading head 22. Head 22 extends through a window 23 in platen 20 for reading magnetic stripes moving along the path. It is the setting of the position of head 22 at its maximum distance from rail 14 and the adjustment of that head to which the present invention is directed. Head 22 is mounted on platen 20 by means of parallel leaf springs 25 and 26 attached to bracket 27 as seen in the figure. Accordingly, head 22 is moved into the proper position for detecting indications on a magnetic stripe by virtue of its relationship to platen 20 which accommodates its position to each medium thickness. The maximum distance between the head and rail 14 must be set in order to ensure proper head contact with the full range of media thicknesses.

Figure 2:
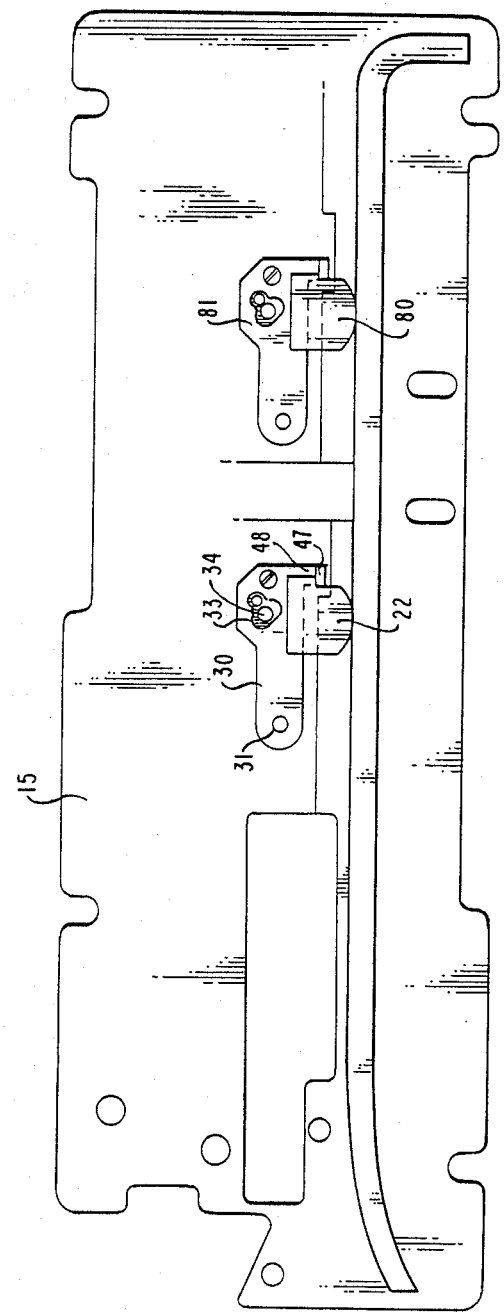
FIG. 2 is a top view of a portion of the organization of FIG. 1 showing a head stop bracket in accordance with this invention.
Figure 3:
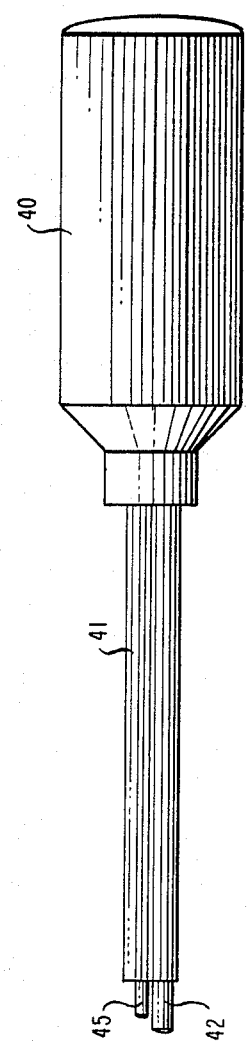
FIGS. 3, 4 and 5 are side, bottom and projection views of a tool for adjusting the bracket of FIG. 2.
Figure 4:
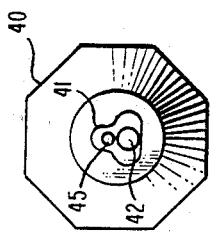
Figure 5:
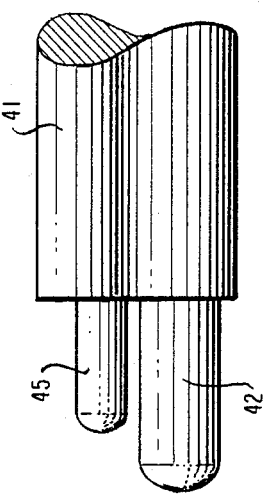

The maximum separation between head 22 and rail 14 is set in accordance with the principles of this invention by bracket 30 as shown in FIG. 2. Bracket 30 is attached to wear plate 15 by pin 31 and is free to move about pin 31. The bracket includes key hole-shaped opening 33. The keyhole opening aligns with aperture 34 in wear plate 15. FIGS. 3, 4, and 5 show a screwdriver-shaped tool 40 having a shaft portion 41 which is adapted to insert into keyhole-shaped opening 33 as seen more clearly in FIG. 4. Specifically, shaft portion 41 has extending therefrom an axially aligned rod-like extension (or shaft) 42 which extends through keyhole-shaped opening 33 into hole 34 in wear plate 15. Shaft portion 41 has a second rod-like extension (or shaft) 45 offset with respect to shaft 42 and shorter. Shaft 45 extends only to engage bracket 30 so that rotation of tool 40 enables a fine adjustment of head by +/− the separation between shafts 42 and 45 about hole 34.

Shafts 42 and 45 are on 0.125 inch centers, leading to a relatively simple technique for achieving adjustments of on the order of 0.0002 inch. The bracket (30) is shown to scale in FIG. 2. Small adjustments, necessary for acceptable reader performance, are easily achieved with the bracket shown with the tool of FIG. 3. Bracket 30 sits flat against wear plate 15 but includes an upstanding extension 47 which engages head 22 along lip 48, thus locking head 22 to the bracket.

The setting procedure for the maximum spacing between rail 14 and head 22 is set by placing an electrically conducting shim of maximum thickness between rail 14 and head 22 and impressing a current through the head, the shim and rail 14. Tool 40 is rotated until the circuit is opened. An ohmmeter in the circuit detects the occurrance of the open circuit indicating the proper setting. Adjustments of 0.006+/−0.001″ have been achieved in a straightforward and simple manner.

Figure 6:
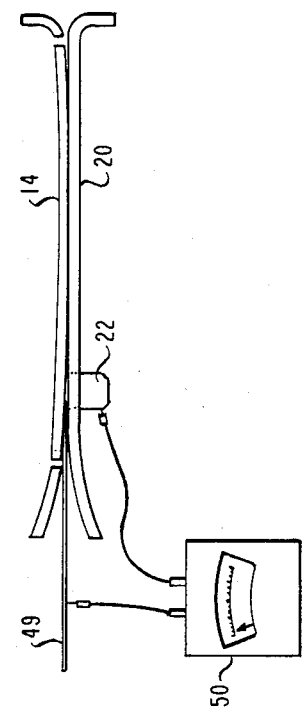
FIG. 6 is a circuit diagram for setting the adjustment of the bracket of FIG. 2.

FIG. 6 shows a circuit arrangement for setting head 22. The circuit shows a shim 49 positioned between rail 14 and platen 20, the shim is 0.006″ thick. An ohmmeter 50 is connected between the shim and the magnetic head 22 as shown in the figure. The head to rail (14) spacing must be held to 0.005″ to 0.007″+/−0.001. The requirements are that the head has to be able to read OCR characters on a media having thicknesses of between 0.003 and 0.008″ while maintaining drag on a 0.004″ medium, slotted at 50 IPS, to less than ninety grams. The reader must also read magnetic media 0.010″ thick, therefore creating the necessity for accurate spacing. The head stop bracket is pivoted for setting and screwed in place when the setting procedure is completed.

FIGS. 1 and 2 show a second magnetic head 80 positioned downstream from head 22 along the reader path. Head 80 also is attached to Platen 20. Head 80 is often present to effect a write-after-read operation and is adjusted independently by bracket 81 as described above.

What is claimed is:

1. A magnetic card reader for reading magnetic stripes on media of different thicknesses, said card reader including a wear plate for providing a bearing surface against which the edge of a medium abuts as it is moved along a path, first and second rails attached to said wear plate and appending therefrom in upstanding first and second opposing spaced-apart positions in a manner to define a path of maximum thickness therebetween, a platen attached to said first rail in a spring-loaded manner to be held relatively close to said second rail to define a path of minimum thickness therebetween, said platen being compliant to media of greater than minimum thickness to adjust said path width thereto, a magnetic head depending from said platen and adapted to engage a magnetic stripe on a medium moving along said path, and adjustable bracket means pivotally attached to said wear plate and adapted for rotation about a pivot point, said bracket being coupled to said magnetic head at a free end thereof, said wear plate including a first hole near said free end of said bracket, said bracket including an eccentric aperture, a portion of which is aligned with said first hole, and means adapted to controllably fix the position of said bracket with respect to said wear plate.

2. A magnetic card reader in accordance with claim 1, wherein said adjustable bracket means adapted to controllably fix the position of such bracket comprises a screw and siad pivot point is adapted to receive said screw, said eccentric aperture being defined by first and second offset intersecting apertures spaced apart from said pivot point, said first aperture being in alignment with said first hole.

* * * * *